US011243835B1

(12) United States Patent
Chan et al.

(10) Patent No.: US 11,243,835 B1
(45) Date of Patent: Feb. 8, 2022

(54) MESSAGE-BASED PROBLEM DIAGNOSIS AND ROOT CAUSE ANALYSIS (71) Applicant: International Business Machines Corporation, Armonk, NY (US)

(72) Inventors: Yuk L. Chan, Rochester, NY (US); Jia Qi Li, Beijing (CN); Lin Yang, Beijing (CN); Tian Wu, Beijing (CN); Lei Yu, Sleepy Hollow, NY (US); Hong Min, Poughkeepsie, NY (US); Fan Jing Meng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/110,458

(22) Filed: Dec. 3, 2020

(51) Int. Cl.
*G06F 11/07* (2006.01)
(52) U.S. Cl.
CPC ........ *G06F 11/079* (2013.01); *G06F 11/0751* (2013.01); *G06F 11/0778* (2013.01)
(58) Field of Classification Search
CPC ............. G06F 11/0751; G06F 11/0769; G06F 11/0775–0781; G06F 11/079
See application file for complete search history.

(56) References Cited

U.S. PATENT DOCUMENTS

| 7,506,195 | B2 | 3/2009 | Takahashi et al. |
| 7,742,875 | B2 | 6/2010 | Li et al. |
| 7,856,575 | B2 | 12/2010 | Bock et al. |
| 7,860,815 | B1 | 12/2010 | Tangirala |
| 8,065,336 | B2 | 11/2011 | Armstrong et al. |
| 8,229,953 | B2 | 7/2012 | Kapuram et al. |
| 8,495,429 | B2 | 7/2013 | Fu et al. |
| 9,086,944 | B2 | 7/2015 | Lentile et al. |
| 9,215,164 | B2 | 12/2015 | Scharf et al. |

(Continued)

FOREIGN PATENT DOCUMENTS

| CN | 101325520 B | 8/2010 |
| CN | 103761173 A | 4/2014 |

(Continued)

OTHER PUBLICATIONS

Chen et al.; "Correlated Anomaly Detection From Large Streaming Data", BigData IEEE International Conference On, pp. 1-11, Dec. 10-13, 2018.

(Continued)

*Primary Examiner* — Joseph R Kudirka
(74) *Attorney, Agent, or Firm* — Cantor Colburn LLP; Teddi Maranzano (57) ABSTRACT

Aspects of the invention include constructing a knowledge graph by writing a plurality of data structures to connect correlated log messages in a system log. Detecting an anomalous log message based on the knowledge graph, wherein the anomalous log message is connected to a plurality of candidate root cause error log messages. Determining respective sequences from each of the plurality of candidate root cause error log messages to the anomalous log message. Calculating a deviation score for each respective sequence based on a deviation of an expected sequence for each candidate root cause error log message and the determined sequence. Determining a root cause log error message based on the calculated deviation scores.

17 Claims, 5 Drawing Sheets

(56) References Cited

U.S. PATENT DOCUMENTS

| | | | |
|---|---|---|---|
| 9,225,730 | B1 | 12/2015 | Brezinski |
| 9,244,755 | B2 | 1/2016 | Huang et al. |
| 9,298,453 | B2 | 3/2016 | Vangala et al. |
| 9,354,961 | B2 | 5/2016 | Nagura et al. |
| 9,367,809 | B2* | 6/2016 | Puri ............... G06F 11/0706 |
| 9,413,837 | B2 | 8/2016 | Vaccari et al. |
| 9,633,106 | B1 | 4/2017 | Saurabh et al. |
| 9,710,322 | B2 | 7/2017 | Jewell et al. |
| 9,734,005 | B2 | 8/2017 | Ruan et al. |
| 9,772,898 | B2* | 9/2017 | Deshpande ............ H04L 41/065 |
| 9,811,795 | B1 | 11/2017 | Kearns et al. |
| 9,891,983 | B1 | 2/2018 | Dechiaro |
| 9,984,060 | B2 | 5/2018 | Bhattacharya et al. |
| 9,984,148 | B2 | 5/2018 | Lee et al. |
| 10,042,613 | B2 | 8/2018 | Castielli et al. |
| 10,042,697 | B2 | 8/2018 | Ahad |
| 10,083,073 | B2 | 9/2018 | Ambichl et al. |
| 10,120,747 | B2 | 11/2018 | Cunico et al. |
| 10,133,568 | B2 | 11/2018 | He et al. |
| 10,140,287 | B2 | 11/2018 | Dasgupta et al. |
| 10,140,576 | B2 | 11/2018 | Eldardiry et al. |
| 10,142,357 | B1 | 11/2018 | Tamersoy et al. |
| 10,162,696 | B2 | 12/2018 | Kogan-Katz et al. |
| 10,169,731 | B2 | 1/2019 | Brew et al. |
| 10,270,668 | B1 | 4/2019 | Thompson et al. |
| 10,303,533 | B1 | 5/2019 | Panov et al. |
| 10,318,541 | B2 | 6/2019 | Bingham et al. |
| 10,339,457 | B2 | 7/2019 | Ryckbosch et al. |
| 10,346,229 | B2 | 7/2019 | Tee et al. |
| 10,346,758 | B2 | 7/2019 | Natsumeda |
| 10,402,255 | B1* | 9/2019 | Niyogi ................ G06F 11/0775 |
| 10,467,318 | B2 | 11/2019 | Truitt et al. |
| 10,523,520 | B2 | 12/2019 | Aggarwal et al. |
| 10,552,289 | B2 | 2/2020 | Ilangovan et al. |
| 10,585,774 | B2 | 3/2020 | Chen et al. |
| 10,616,038 | B2 | 4/2020 | Kushmerick et al. |
| 10,628,747 | B2 | 4/2020 | Chen et al. |
| 10,637,745 | B2 | 4/2020 | Naous |
| 10,673,721 | B2 | 6/2020 | Hashimoto et al. |
| 2004/0249821 | A1 | 12/2004 | Nies et al. |
| 2011/0083123 | A1* | 4/2011 | Lou ..................... G06F 11/0706 717/125 |
| 2011/0087924 | A1* | 4/2011 | Kandula ............. G06F 11/0709 714/26 |
| 2013/0124923 | A1 | 5/2013 | Wang et al. |
| 2014/0365575 | A1 | 12/2014 | Spaven et al. |
| 2016/0124823 | A1 | 5/2016 | Ruan et al. |
| 2016/0253229 | A1 | 9/2016 | Sade et al. |
| 2016/0307285 | A1 | 10/2016 | Gallagher |
| 2017/0013003 | A1 | 1/2017 | Samuni et al. |
| 2017/0228460 | A1 | 8/2017 | Amel et al. |
| 2018/0041500 | A1 | 2/2018 | Menahem et al. |
| 2018/0144041 | A1 | 5/2018 | Chen et al. |
| 2018/0211197 | A1 | 7/2018 | Vosseler et al. |
| 2018/0219723 | A1 | 8/2018 | Scarpelli et al. |
| 2018/0308001 | A1 | 10/2018 | Doddala et al. |
| 2019/0073257 | A1 | 3/2019 | Dasgupta et al. |
| 2019/0114244 | A1 | 4/2019 | Salunke et al. |
| 2019/0188286 | A1 | 6/2019 | Chan et al. |
| 2019/0250970 | A1 | 8/2019 | Gupta et al. |
| 2019/0356533 | A1 | 11/2019 | Vasseur et al. |
| 2019/0391863 | A1 | 12/2019 | Ofer et al. |
| 2020/0076841 | A1 | 3/2020 | Hajimirsadeghi et al. |
| 2020/0104775 | A1 | 4/2020 | Chintalapati et al. |
| 2020/0117668 | A1 | 4/2020 | Chamarajnagar |
| 2020/0142954 | A1 | 5/2020 | Mandalia et al. |
| 2020/0167350 | A1 | 5/2020 | Miller et al. |
| 2020/0201701 | A1 | 6/2020 | Wang et al. |
| 2020/0226362 | A1 | 7/2020 | Hu et al. |

FOREIGN PATENT DOCUMENTS

| | | |
|---|---|---|
| CN | 105577440 B | 6/2019 |
| CN | 106293648 B | 11/2019 |
| CN | 107248927 B | 6/2020 |
| EP | 2863309 B1 | 11/2018 |
| KR | 101328328 B1 | 11/2013 |
| WO | 2015168141 A1 | 11/2015 |
| WO | 2017020973 A1 | 2/2017 |
| WO | 2017180666 A1 | 10/2017 |
| WO | 2020023787 A1 | 7/2019 |

OTHER PUBLICATIONS

Du, M. et al., "DeepLog: Anomaly Detection and Diagnosis from System Logs through Deep Learning," Session F2: Insights from Log(in)s CCS'17, Oct. 30-Nov. 3, 2017, Dallas, TX, USA, 14 pages.

Eldardiry et al.; "Multi-Source Fusion For Anomaly Detection: Using across-domain and across-time peer-group consistency checks", JoWUA Journal Of, vol. 5, No. 2, pp. 39-58, Jun. 6, 2014.

Farschi et al.; "Anomaly Detection of Cloud Application Operations Using Log and Cloud Metric Correlation Analysis"; ISSRE IEEE 26th International Conference On, pp. 1-11, Nov. 2-5, 2016.

Gao et al.; "Modeling Probabilistic Measurement Correlations For . . . Distributed Systems", ICDCS IEEE 29th International Conference On, pp. 623-630, Jun. 22-26, 2009.

Leman Akoglu et al., "Graph based Anomaly Detection and Description: A Survey." Data Mining and Knowledge Discovery, vol. 29, No. 3 (2015): pp. 1-68.

List of IBM Patents or Patent Applications Treated as Related; Appendix P; Date Filed: Jan. 11, 2021; 2 pages.

Madireddy et al.; "Analysis And Correlation Of Application I/O Performance And System-Wide I/O Activity", Argonne National Laboratory, pp. 1-12, Apr. 2017.

Peiris et al.; "PAD: Performance Anomaly Detection In Multi-Server Distributed Systems", Cloud IEEE 7th International Conference On, pp. 769-776, Jun. 27-Jul. 2, 2014.

Peng et al.; "CM-GANs: Cross-Modal Generative Adversarial Networks For Common Representation Learning", Cornell University Library, arXiv:1710.05106v2,pp. 1-13,Apr. 26, 2018.

Song, Lei; "Informative Correlation Extraction From And For Forex Market Analysis", Auckland University Of Technology, Master's Thesis, pp. 1-73, May 2010.

U.S. Appl. No. 17/110,432, filed Dec. 3, 2020, Entitled: Multi-Source Data Correlation Extraction for Anomaly Detection, First Named Inventor: Yuk L. Chan.

U.S. Appl. No. 17/110,438, filed Dec. 3, 2020, Entitled: Correlation-Based Multi-Source Problem Diagnosis, First Named Inventor: Yuk L. Chan.

Yuk L. Chan et al., "Graph-Based Log Sequence Anomaly Detection and Problem Diagnosis," U.S. Appl. No. 17/110,535, filed Dec. 3, 2020.

Yuk L. Chan et al., "Integrating Documentation Knowledge With Log Mining for System Diagnosis," U.S. Appl. No. 17/110,430, filed Dec. 3, 2020.

Yuk L. Chan et al., "Log-Based Status Modeling and Problem Diagnosis for Distributed Applications," U.S. Appl. No. 17/110,513, filed Dec. 3, 2020.

Yuk L. Chan et al., "Message Correlation Extration for Mainframe Operation," U.S. Appl. No. 17/110,431, filed Dec. 3, 2020.

Yuk L. Chan et al., "Message-Based Event Grouping for a Computing Operation ," U.S. Appl. No. 17/110,460, filed Dec. 3, 2020.

Zhong et al.; "An Improved Correlation-Based Anomaly Detection Approach For Condition Monitoring Data Of Industrial Equipment", ICPHM IEEE Inter. Conf. On, pp. 1-6, Jun. 20-22, 2016.

* cited by examiner

IEF438I SUBTASK OF *jobname* TERMINATED. COMPLETION CODE *cde*

302    304

300

Explanation
Either a user-written writer or the IBM-supplied writer subtask of the External Writer abnormally terminated; therefore, the External Writer was unable to print or punch the SYSOUT data set. In the message text, *jobname* is the jobname assigned to the external writer that terminated and *cde* is the completion code, in hexadecimal.

System action
The external writer ended.

Operator response
Enter another START XWTR command if anymore SYSOUT data sets are to be processed by the External Writer.

Source
JES2

Routing code
2

Descriptor code
4

MESSAGE-BASED PROBLEM DIAGNOSIS AND ROOT CAUSE ANALYSIS

BACKGROUND

The present invention generally relates to programmable computing systems, and more specifically, to message-based problem diagnosis and root cause analysis.

Root cause analysis is a systematic approach for locating a reason and/or a computing component that is the root cause of an error in a computer system environment. Mainframe computing systems have a message logging system, where all nodes associated with the operating system can write the messages. The nodes can include and not be limited to the applications, operating system, storage system, and workload managers. Each component can write multiple informational, warning or error messages to the logging system. During root cause analysis, some of these messages can reveal the reason and/or component that caused the error.

SUMMARY

Embodiments of the present invention are directed to computing-based methods, computing systems, and computer program products for message-based problem diagnosis and root cause analysis for. A non-limiting example computer-implemented method includes constructing a knowledge graph by writing a plurality of data structures to connect correlated log messages in a system log. Detecting an anomalous log message based on the knowledge graph, wherein the anomalous log message is connected to a plurality of candidate root cause error log messages. Determining respective sequences from each of the plurality of candidate root cause error log messages to the anomalous log message. Calculating a deviation score for each respective sequence based on a deviation of an expected sequence for each candidate root cause error log message and the determined sequence. Determining a root cause log error message based on the calculated deviation scores.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products for a graph-based root cause error analysis for a mainframe.

Log messages are written by applications executing on nodes of a mainframe computing system. Mainframe computing systems store the log messages in a system log as a running journal of the mainframe's operations. System administrators monitor the log messages to identify concerning log messages. In addition, machine learning software can analyze the log messages to identify anomalous log messages. The concerning log messages or anomalous log messages suggest that a suspicious situation, but not necessarily an error, occurred at a node during the execution of an application. For example, a log message that can be considered an anomaly if it is out of sequence or irregular for an application to write the log message. When a mainframe node fails, the application executing on the node can write one or more messages describing the failure, and interleave with other messages including the informational or warning messages. Unfortunately, when a mainframe node fails, the failure within the node can trigger other errors at different scopes or components within the node. Furthermore, it can propagate the error to various other nodes of the mainframe. In this situation, multiple nodes can write log messages that can be identified as anomalies. This situation can be difficult for a system administrator to determine whether a log message is describing a root cause of an error or a victim error caused by the root cause error. The inability to distinguish between the log messages elongates the time required to perform the root cause error analysis.

One or more embodiments of the present invention address one or more of the above-described shortcomings by providing computer-implemented methods, computing systems, and computer program products that can construct a knowledge graph based on semantic and statistical relationships between log messages, and perform a root cause error analysis using the knowledge graph. The knowledge graph analytics are leveraged to discover and illustrate correlations of log messages from different mainframe subsystems, which can be the foundation of a problem diagnosis and fault localization when there are detected anomalies. Furthermore, the error propagation sequence can be found based on the directional relations in the knowledge graph to localize the exact potential causes of the error without manual inference or in-depth domain knowledge of a mainframe.

Figure 1:
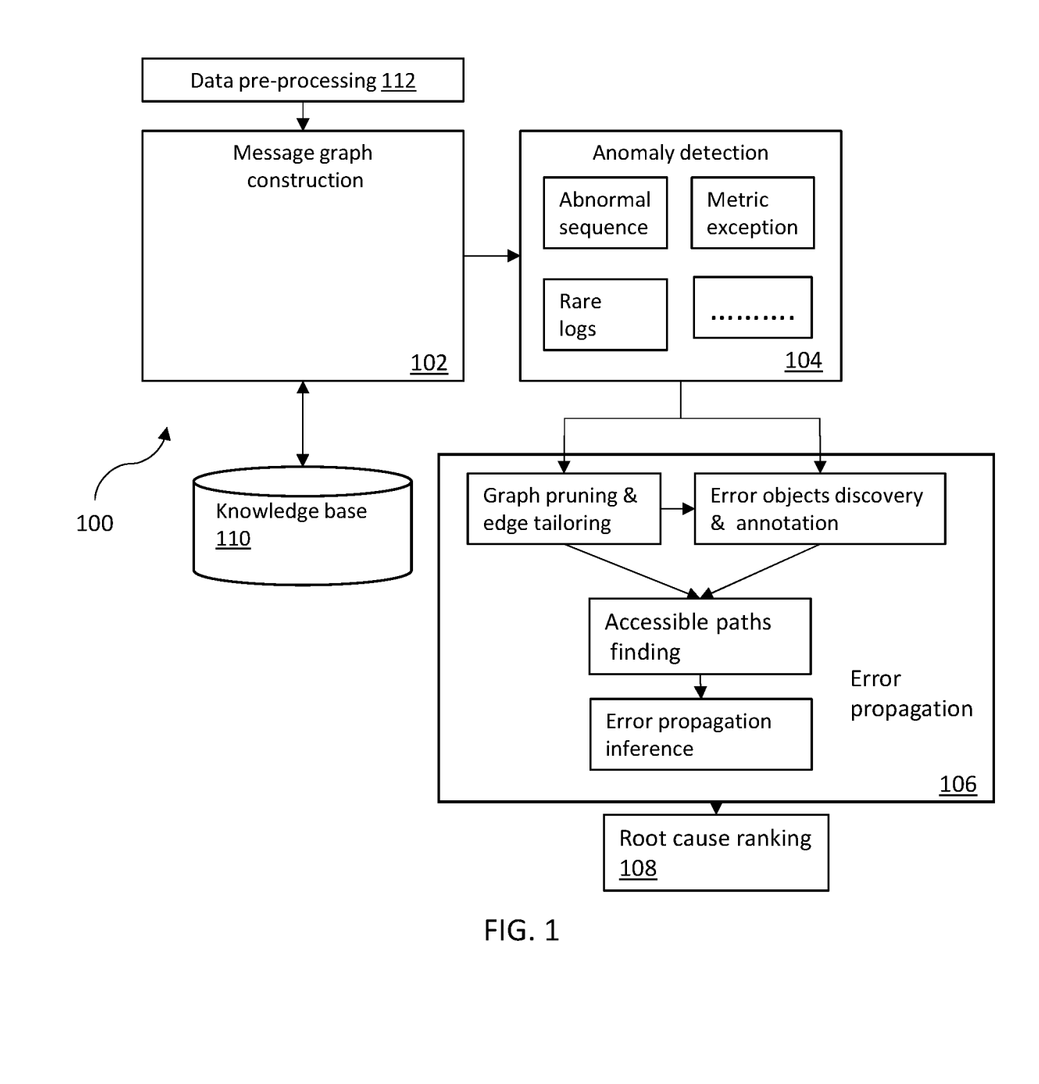
FIG. 1 illustrates a block diagram of components of a system for graph-based root cause error analysis in accordance with one or more embodiments of the present invention.

Turning now to FIG. 1, a system 100 for message-based root cause analysis is generally shown in accordance with one or more embodiments of the present invention. The system 100 includes a message graph construction unit 102 for constructing a knowledge graph to reveal correlations between log messages. The system 100 includes an anomaly detection unit 104 for detecting anomalous log messages and annotating the messages in the knowledge graph. The system 100 further includes an error propagation unit 106 for evaluating a relationship between the nodes of the knowledge graph and determining each possible root cause error. The system 100 further includes a root cause ranking unit 108 for ranking each of the possible root causes based on the error propagation.

The message graph construction unit 102 can analyze log messages and construct a knowledge graph that reveals the correlations between the log messages. Each log message contains a message identification, a message text, and a timestamp indicating when the message was written. The message graph construction unit 102 can semantically and statistically analyze each log message and determine a context of the message. The message graph construction unit 102 can apply natural language processing techniques to analyze the morphology, syntax, and logical semantics of the text of the log message to determine a phrase composition of the log message. For example, the message graph construction unit 102 can traverse the text of the message graph to determine a context of the log message. The message graph construction unit 102 can also semantically analyze the log messages to determine a correlation between two log messages. For example, message graph construction unit 102 can determine that two log messages are correlated based on both log messages having a threshold number of keywords in common. The message graph construction unit 102 can also make the determination based on a functional relationship between log messages. For example, message graph construction unit 102 can retrieve a message identification code of a first log message and detect that the log message relates to the initiation of a job task. The message graph construction unit 102 can also retrieve a message identification code of a log message and detect that the log message relates to either the completion of the job task or a conditional response to initiation of the job task. In this instance, the two log messages are functionally correlated. In another example, the message graph construction unit 102 can associate related log messages based on some pre-determined relationship. A user or software can provide a hard-coded mapping of the related messages. A mapping of related messages can also be extracted from the documentation related to the messages, for example from the IBM Knowledge Center.

The message graph construction unit 102 can construct the knowledge graph, in which each node describes a log message and each edge describes a correlation between two log messages. The message graph construction unit 102 can construct the knowledge graph by writing a data structure into a knowledge base 110 (system log) of a mainframe. For example, the data structure can be a pointer that includes a memory address of a correlated log message. The knowledge graph is a directed graph, and therefore a log message points to a subsequent log message. The message graph correlation unit can determine that a message is a subsequent log message based on the time stamps of the log messages or a functional relationship of the log messages.

In addition, the message graph construction unit 102 can continuously analyze incoming log messages as they are written and stored onto the mainframe's system. The incoming log messages can be analyzed, and the message graph construction unit 102 can determine whether the incoming log message correlates to another log message. In the event that an incoming log message correlates to another log message, the message graph construction unit 102 can construct an edge between the log messages. In the event that the incoming log message does not correlate to another message, the message graph construction unit 102 does not connect the incoming log message to another log message.

In some embodiments of the present invention, the log messages are received from a preprocessing unit 112. The preprocessing unit 112 can analyze the log messages by comparing the log messages to templates for the log message to determine whether any information is missing. The preprocessing unit 112 can also remove noisy data, such as corrupted log messages. The preprocessing unit 112 can further normalize the message logs to a compatible format. For example, log messages are written by numerous applications executing on single or multiple different nodes of a mainframe. The applications can write the log messages under different languages, schema, or formats that may not be compatible with each other or the system 100. The preprocessing unit 112 can convert the log messages into a machine-readable format that is compatible with the system 100.

Figure 5:
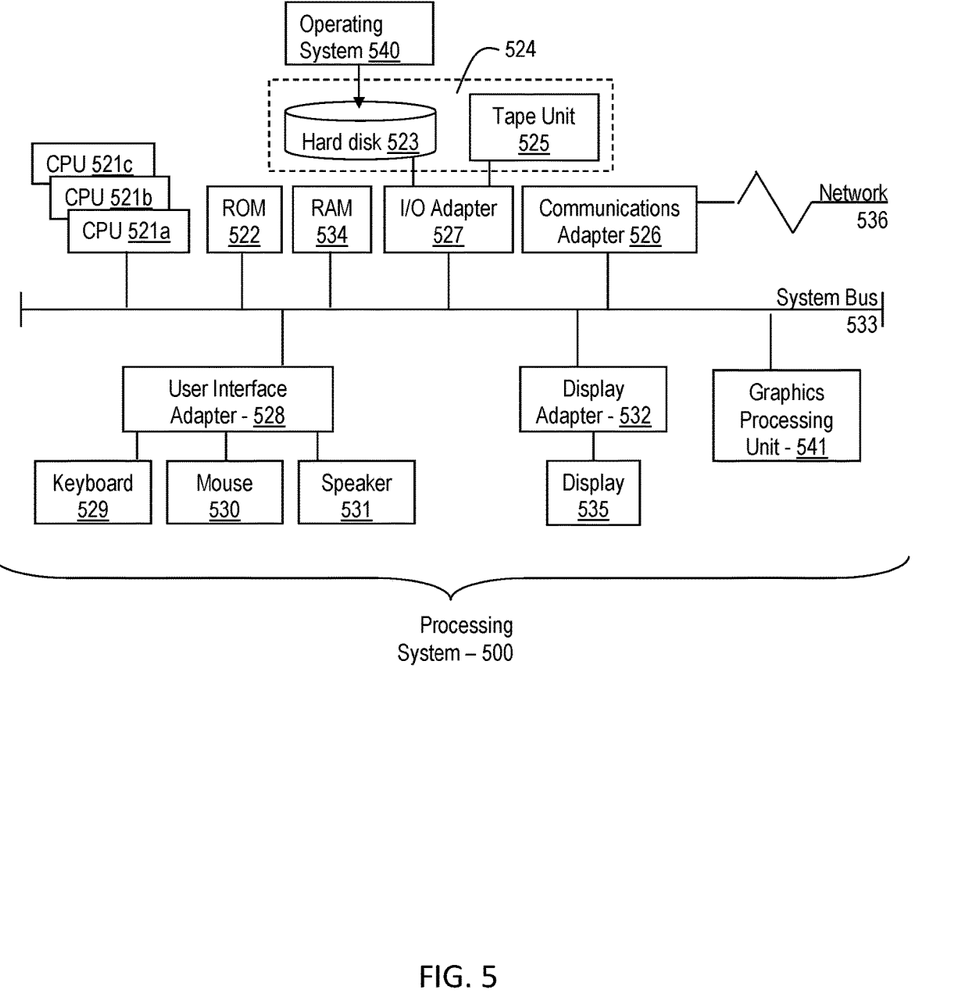
FIG. 5 illustrates a block diagram of a computer system for use in implementing one or more embodiments of the present invention.

The knowledge graph can be implemented using any suitable software constructs, including those described in FIG. 5. In some embodiments of the present invention, the knowledge graph is implemented using object-oriented constructs, in which each node is an object associated with a log message. A node can include a pointer that points to a log message in the system log. Each edge can be an object having associated functions and variables. Each edge connects two nodes and describes a functional, statistical, and/or semantic relationship between the two log messages respectively represented by the two nodes. The data contained in the knowledge graph can be stored in a knowledge base 110, for example, a mainframe system log. In some embodiments, the system 100 can be implemented using machine learning circuitry or as a neural network, including a multi-layered feedforward network.

In some embodiments of the present invention, the knowledge graph is a directed graph, in which a first node points to at least a second node. For example, a first node can represent a log message written due to an initiation of a job task, and a second node can represent a log message written due to a completion of the job task. In this instance, the first node points to the second node. As further illustration, a third node can represent a log message written due to a condition being met as a result of the initiation of the job task. In this instance, the first node would also point to the third node.

The anomaly detection unit 104 detecting abnormal messages contained in the knowledge graph constructed by the message graph construction unit 102. The anomaly detection unit 104 traverse the knowledge graph to determine whether any log message is indicative of an anomaly or in other words, a suspected error in the execution of an application at a node of the mainframe. The anomaly detection unit 104 can use various methods to detect an anomaly that ranges from focusing on the text of a single log message to analyzing patterns between the log messages.

In one embodiment of the present invention, the anomaly detection unit 104 can search for message identification codes in the log message that suggest an anomaly. Each log message includes a message identification code, which is a unique identifier of the log message. In many instances, the message identification code is alphanumeric code and is specific to the operating system being run on the mainframe.

As an application executing a job, the application will write a sequence of messages. In many instances, the messages are a routine update of the status of the job. A job is a unit of execution for an application. Each job also includes a unique identification code. However, in certain instances, the presence of a particular message in and of itself is an indication of an anomaly. For example, the anomaly detection unit 104 can access a statistical analysis of previous instances of log messages written for a job and determine that a particular message is rarely written in connection with the job. The anomaly detection unit 104 can detect a percentage of instances that a log message was written for a particular job and compare that percentage to a threshold percentage. If the percentage is greater than the threshold percentage, the anomaly detection unit 104 does not detect an anomaly. If, however, the percentage is lower than the threshold percentage, and the log message is written during the job, the anomaly detection unit 104 can determine that the log message suggests an anomaly In this instance, the anomaly detection unit 104 can read the message identification code and flag the log message as indicative of an error.

In other embodiments of the present invention, the anomaly detection unit 104 can analyze the present sequence of messages in relation to a particular job. In addition, the anomaly detection unit 104 can access a statistical analysis of previous instances log messages sequences written for the particular job to determine whether an anomaly exists. The statistical analysis can include a frequency of anomalies at a node or application, frequency that particular sequences are associated with anomalies, or other appropriate statistics. Based on the statistical analysis, the anomaly detection unit 104 can determine whether the present sequence of log messages is indicative of an anomaly.

In yet other embodiments of the present invention, the anomaly detection unit 104 can look to the structure of the knowledge graph itself to detect an anomaly. The knowledge is comprised of nodes that are either connected to one or more nodes or not connected to any other nodes. The positioning of the nodes and the connections form patterns. The patterns can be based on the number of connected nodes, the source applications of the log messages described by the connected nodes, or other pattern source. The pattern can be the connection pattern of the nodes, for example, a first node connected to a second node, wherein the second node is connected a fourth node and the fourth node is directly connected to a fifth and sixth node. In any case, the anomaly detection unit 104 can have access to a table to anomalous node patterns. The anomaly detection unit 104 can further compare the node patterns of the present knowledge graph with the anomalous patterns in the table. The anomaly detection unit 104 can further determine whether any node pattern in the present knowledge graph is an anomaly based on the comparison.

In yet another embodiment, the anomaly detection unit 104 can determine whether a log message is an anomaly based on a metric analysis. The anomaly detection unit 104 can access of database of log message-based metrics. The metrics can include, for example, a distribution of nodes of a mainframe, and a distribution of log messages written by each node. The distribution of log messages includes a frequency that an application at each node wrote each message. The distribution can further include an indication of each instance that a log message was an anomaly. The anomaly detection unit 104 can compare a message identification code of an incoming message with the metric database to determine whether the incoming log message is an anomaly. The determination can be based on the message inherently being an anomaly, for example, an error message. The determination can also be based a frequency that a message is written by an application at a node. The anomaly detection unit 104 can retrieve a message identification code from an incoming log message from an application at a node. The anomaly detection unit 104 can access the metrics database and determine the number of times the application at the node has written the same log message. In the event that the application has written the node less than a threshold amount, the anomaly detection unit 104 can determine that the incoming log message is an anomaly. In the event that the application has written the node more than a threshold amount, the anomaly detection unit 104 can determine that the incoming log message is not an anomaly.

The anomaly detection unit 104 can modify the knowledge graph based on a determination that a log message is an anomaly. The modification can reflect the determination that log message is an anomaly. For example, the anomaly detection unit 104 can write a bit to the log message at the system log 110 to indicate that the underlying log message is an anomaly.

The system 100 further includes an error propagation unit 106 for determining a root cause error of a mainframe, based on the knowledge graph. The error propagation unit 106 can identify a target domain and prune the knowledge graph to remove noisy edges and irrelevant nodes. In this instance, the target domain can be a target log message. The noisy edges can be redundant edges, and the irrelevant nodes can be nodes that did not contribute to the writing of the target log message.

The error propagation unit 106 can generate a model-based prediction for a root cause error. The model can be trained using previous instances of log messages written by an application executing on various components of a mainframe. The model can be trained to calculate a probability that each log message is followed by another particular log message. For example, the error propagation unit 106 can calculate that a log message written for initiation of a task is followed by a log message for completion of the task. An edge connecting a first node and a second node can describe a probability that the first log message is followed by the second log message. For example, log message A is most likely followed by log message B, and the probability that log message A is followed log message B may be seventy percent. However, the probability that log message A is followed by log message C may be thirty percent. Therefore, if log message A is followed by log message C, the sequence has deviated from an expected sequence. Each log message is generated by an application executing a job at a particular node. Therefore, the probabilities can be based on the particular application, the particular job, and/or the particular node.

Based on the probabilities, the error propagation unit 106 can determine a probability for various sequences of connected log messages beginning at a candidate log root cause error log message and each other log message. For example, the error propagation unit 106 retrieve statistics and determine the probability that a first sequence runs from log message A to log message B to log message C is sixty-five percent. The error propagation unit 106 also determine the probability that a second sequence runs from log message A to log message B to log message D is sixty-five percent. Based on the probabilities, the error propagation unit 106 can determine that a sequence beginning with log message A to log message B is expected to proceed to log message C.

The error propagation unit 106 can then compare a sequence beginning at a target log message and ending at a candidate root cause error log message with an expected sequence and calculate a deviation score. Using the example, above, if the sequence occurred, the error propagation unit 106 could calculate a deviation score based on the deviation of the second sequence from the expected first sequence. The error propagation unit 106 can perform this comparison for each candidate sequence between a target log message and each candidate root cause error log message. The error propagation unit 106 can further calculate a deviation score for each sequence between a candidate root cause error log message and the target log message. The error propagation unit 106 can then select the candidate root cause error log messages with the k-highest deviation scores for ranking and displaying to a user.

Once the error propagation unit 106 determines the k-highest a candidate root cause error log message(s), it can send an input signal (stimulation signal) to the application that wrote the candidate root cause error log message. The input signal can be any signal to cause the application to rewrite the same log message as the candidate root cause error log message. The error propagation unit 106 can monitor the system log to see if the input signal causes the same sequence of log messages leading to the same target log message is generated by the application operating on the mainframe. If the same sequence is generated then the error propagation unit 106 can confirm the candidate root cause error log message. If another log message sequence is generated, the error propagation unit 106 does not verify the candidate root cause error log message, and compares the new sequence of log messages to the expected sequence or sequences of log messages.

The system 100 includes a root cause ranking unit 108 for ranking each candidate root cause log message. The root cause ranking unit 108 receives the deviation scores and ranks each candidate root cause error log message. The ranked list, including the sequence of log messages, the candidate root cause error log messages, and scores is presented to a user via a display The phrases "neural network" and "machine learning" broadly describes a function of electronic systems that learn from data. A machine learning system, engine, or module can include a machine learning algorithm that can be trained, such as in an external cloud environment, to learn functional relations between inputs and outputs that are currently unknown. In one or more embodiments, machine learning functionality can be implemented using the system 100, having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The system 100 can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the system 100 that carry electronic messages between simulated neurons are provided with numeric weights that correspond to the strength or weakness of a given connection. During training, The weights can be adjusted and tuned based on experience, making the system 100 adaptive to inputs and capable of learning. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Figure 2:
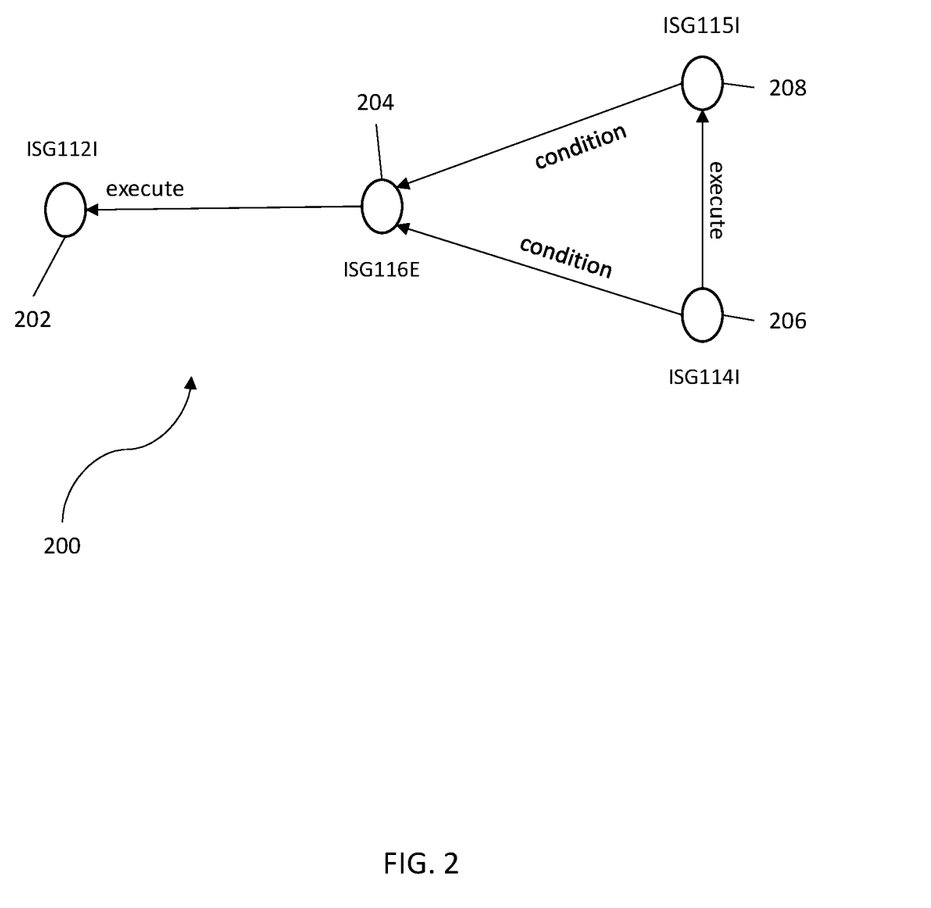
FIG. 2 illustrates a knowledge graph for error propagation in accordance with one or more embodiments of the present invention.

Referring to FIG. 2, a knowledge graph portion 200 is illustrated. It should be appreciated that the anomaly detection unit 104 has traversed a knowledge graph and identified the anomalous log messages. Furthermore, the error propagation unit 106 has pruned the knowledge graph to those anomalous log messages related to a target log message ISG112 to reach the present knowledge graph portion 200. The first node 202 is for the target log message ISG112I, the second node 204 is for log message ISG116E, the third node is for log message ISG114I, and the fourth node is for log message ISG115I. As illustrated, log message ISG112 is an anomaly and suggests that there is an error at a node of the mainframe. Furthermore, log messages ISG114I, ISG115I, and ISG116E are also anomalous and are correlated to log message ISG112, and log message ISG112 was written as a result of some action or condition described in log messages ISG114I, ISG115I, and ISG116E. However, initially, it is unclear whether log message ISG114I, ISG115I, and ISG116E are written by an application as a result of the application being the root cause of the error, or as a result of an event caused by the root cause.

The error propagation unit 106 can identify sequences of log messages that potentially lead to a root cause error for message ISG1121. As illustrated in FIG. 2, the first sequence is log message ISG112I to log message ISG116E. The second sequence is log message ISG116E to log message ISG115I. The third sequence is log message ISG116E to log message ISG114I. In other words, the root cause of the error is associated with log message ISG114I, ISG115I, or log message ISG116E. The error propagation unit 106 can calculate a deviation score for each of the log messages ISG114I, ISG115I, or ISG116E. The error propagation unit 106 can then determine a likeliest candidate root cause error log message based on the deviations scores.

The error propagation unit 106 can receive the calculations from the error propagation unit 106 and rank each log message as being generated as a result of the root cause of the error. The root cause ranking unit 108 can further take into account a position of each log message along the sequence as defined by the knowledge graph. As seen in FIG. 2, log message ISG114I led to both log message ISG116I and ISG115I. Based on positioning and the deviation calculation, the error propagation unit 106 can determine that the application that wrote log message ISG114I has the highest probability of being the root cause of the anomalies. If this were so, log message ISG115I and ISG116E are anomalies resulting from the error caused by the application. The error propagation unit 106 can also determine that log message ISG1141 has the second highest probability of being written by an application that is the root cause error. Furthermore, the error propagation unit 106 can also determine that log message ISG1161 has the third highest probability of being written by an application that is the root cause error. It should be appreciated that this example is illustrative, and the knowledge graph portion 200 could include any number of nodes and, based on calculations, any log message could be associated with the root cause error.

Figure 3:
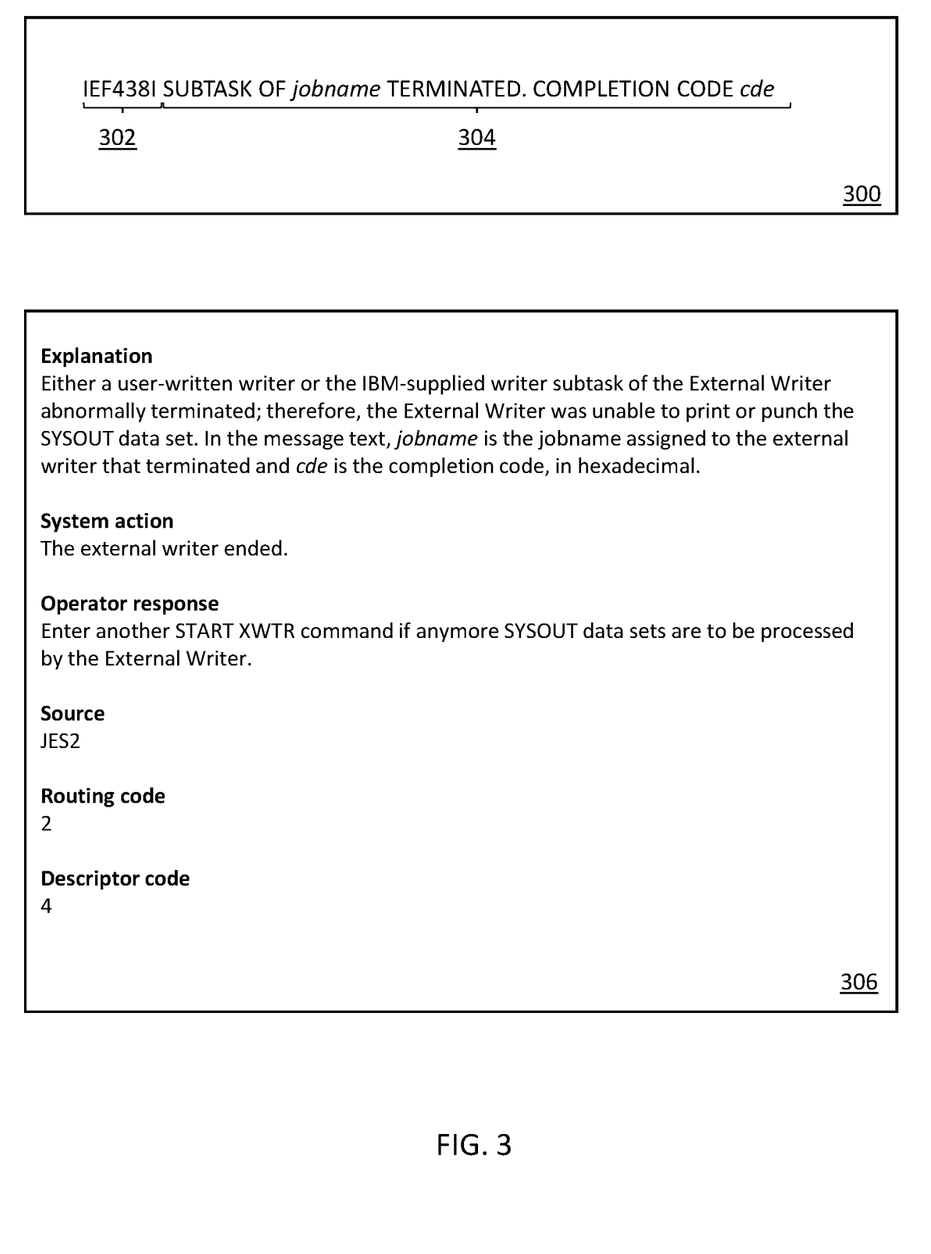
FIG. 3 illustrates an exemplary log message in accordance with one or more embodiments of the present invention.

Referring to FIG. 3, a template for a log message 300 and a narrative explanation is shown. The log message 300 includes a message identification code 302 and a message text 304. The narrative description 306 provides an explanation (quick definition use) for the template for the log message 300. The narrative description 306 is generally made available online by the servicer of the mainframe operating system. In some embodiments of the present invention, the system 100 can access a servicer database and retrieve the narrative description 306 based on the message identification code 302. The message graph construction unit 102 can further construct the knowledge graph based on a semantic analysis of the narrative description 306.

Figure 4:
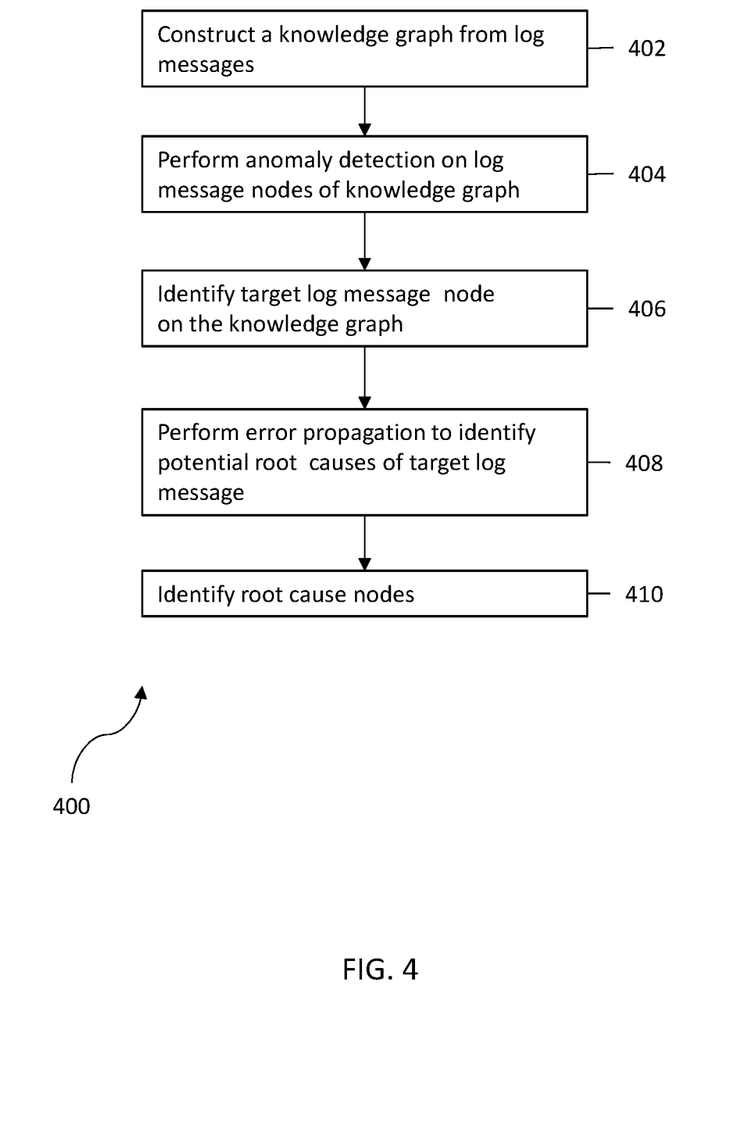
FIG. 4 illustrates a flow diagram of a process for graph-based root cause error analysis in accordance with one or more embodiments of the present invention.

Referring to FIG. 4, a flow 400 for graph-based root cause error analysis is shown. It should be appreciated that all or a portion of the processing shown in FIG. 4 can be performed by a computer system, such as system 100 of FIG. 1. At block 402, the message graph construction unit 102 constructs a knowledge graph from log messages in a mainframe system log. The message graph construction unit 102 can apply natural language processing techniques to determine semantic relationships between the log messages. The message graph construction unit 102 can construct a knowledge graph, in which the nodes represent log messages and the edges represent the semantic relationship between the log messages. The message graph construction unit 102 can construct the knowledge graph by writing in pointer to the system log to point a first log message to a second log message based on a semantic, statistical, or functional relationship between the log messages. The direction of the pointer is based on the second lob message being written after the first log message.

At block 404, the anomaly detection unit 104 can traverse each method to determine if any log message is an anomaly. The anomaly detection unit 104 is operable to perform various methods to determine whether a log message is an anomaly. For example, the anomaly detection unit 104 can use the directional knowledge graph to follow sequences of correlated log messages to detect whether the sequence suggests an anomaly. The sequences can be the complete sequence of correlated log messages or a portion of a sequence of correlated log messages. For example, if thirty correlated messages form a sequence, the anomaly detection unit 104 can follow the entire thirty log messages or a portion of the thirty log messages. The anomaly detection unit 104 can then compare the patterns of the log messages to stored patterns of log message anomalies, and determine whether there is an anomaly.

A second option if for the anomaly detection unit 104 to read each log message identification code and compare each log message with a frequency of occurrences for a particular application, job, and/or node. If the frequency of the occurrence of a log message is below a threshold frequency, the anomaly detection unit 104 can determine that the log message is an anomaly.

A third option is for the anomaly detection unit 104 to analyze the patterns of the correlated log messages and compare the patterns to stored patterns of known anomalies. As an illustration, log message IEF** is directly correlated with log message IFC, log message IEW, and log message ISG. In this instance, the node representing log message IEF would be attached to three edges connected to three respective nodes. The anomaly detection unit 104** can compare this pattern to a database of stored patterns, including any directional data (e.g., pointers) to determine if there is a match to pattern that includes an anomaly.

A fourth option is for the anomaly detection unit 104 to identify anomalous log message based on a statistical analysis of the mainframe, including the application, jobs, and nodes. The anomaly detection unit 104 can perform a comparison between previous operating conditions in which an anomaly log message was written and the present mainframe operation conditions. In the event that the operating conditions are similar, the anomaly detection unit 104 can identify the log messages that were anomalies and identify the same or similar current log messages.

In each instance, that the anomaly detection unit 104 detects an anomaly, regardless of method, and further amends the knowledge graph to identify the anomaly. For example, the anomaly detection unit 104 can amend the knowledge graph by writing a bit to the node representing the anomalous log message.

At block 406 a user, (e.g., a system administrator) can select a target log message. The user can select the target message through various input devices 529 (e.g., a keyboard, a microphone, a touchscreen, etc.). In response to receiving the selection, the error propagation unit 106 can prune the knowledge graph to remove any nodes that are not correlated to the target node. The error propagation unit 106 can further remove any redundant edges. For example, a first node can be connected to a second node and a third node. The second node can be connected to a fourth node and the first node can also be connected to the fourth node. Therefore, the first node is indirectly connected to the fourth node via the second node. The edge connecting the first node and the fourth node is redundant, and can be removed. This reduces any unnecessary calculations and allows the error propagation unit 106 to operate faster. The error propagation unit 106 can further determine a path from the target node back to each node in the sequence of correlated nodes. The error propagation unit 106 unit can calculate a deviation score based on a difference of an expected sequence of log messages beginning with the candidate root cause node and the actual sequence of the candidate root cause error node to the target node.

At block 410 the root cause ranking unit 108 can receive the deviation scores of each candidate root cause error node and rank each node based on the highest probability of being the root cause error node to the lowest probability of being the root cause error node. The rankings can be displayed for a user on a user's computing device.

It is understood that the present disclosure is capable of being implemented in conjunction with any other type of computing environment now known or later developed. For example, FIG. 5 depicts a block diagram of a processing system 500 for implementing the techniques described herein. In examples, the processing system 500 has one or more central processing units (processors) 521a, 521b, 521c, etc. (collectively or generically referred to as processor(s) 521 and/or as processing device(s)). In aspects of the present disclosure, each processor 521 can include a reduced instruction set computer (RISC) microprocessor. Processors 521 are coupled to system memory (e.g., random access memory (RAM) 524) and various other components via a system bus 533. Read only memory (ROM) 522 is coupled to system bus 533 and may include a basic input/output system (BIOS), which controls certain basic functions of the processing system 500.

Further depicted are an input/output (I/O) adapter 527 and a network adapter 526 coupled to the system bus 533. I/O adapter 527 may be a small computer system interface (SCSI) adapter that communicates with a hard disk 523 and/or a storage device 525 or any other similar component. I/O adapter 527, hard disk 523, and storage device 525 are collectively referred to herein as mass storage 534. Operating system 540 for execution on processing system 500 may be stored in mass storage 534. The network adapter 526 interconnects system bus 533 with an outside network 536 enabling processing system 500 to communicate with other such systems.

A display (e.g., a display monitor) 535 is connected to the system bus 533 by display adapter 532, which may include a graphics adapter to improve the performance of graphics intensive applications and a video controller. In one aspect of the present disclosure, adapters 526, 527, and/or 532 may be connected to one or more I/O busses that are connected to the system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adapter 532. An input device 529 (e.g., a keyboard, a microphone, a touchscreen, etc.), an input pointer 530 (e.g., a mouse, trackpad, touchscreen, etc.), and/or a speaker 531 may be interconnected to system bus 533 via user interface adapter 528, which may include, for example, a Super I/O chip integrating multiple device adapters into a single integrated circuit In some aspects of the present disclosure, the processing system 500 includes a graphics processing unit 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing and has a highly parallel structure that makes it more effective than general-purpose CPUs for algorithms where processing of large blocks of data is done in parallel.

Thus, as configured herein, the processing system 500 includes processing capability in the form of processors 521, storage capability including system memory (e.g., RAM 524), and mass storage 534, input means such as keyboard 529 and mouse 530, and output capability including speaker 531 and display 535. In some aspects of the present disclosure, a portion of system memory (e.g., RAM 524) and mass storage 534 collectively store the operating system 540 to coordinate the functions of the various components shown in the processing system 500.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
constructing, by a processor, a knowledge graph by writing a plurality of data structures to connect correlated log messages in a system log;
detecting, by the processor, an anomalous log message based on the knowledge graph, wherein the anomalous log message is connected to a plurality of candidate root cause error log messages;
writing, by the processor, a bit to the system log to identify the anomalous log message;
determining, by the processor, respective sequences from each of the plurality of candidate root cause error log messages to the anomalous log message;
calculating, by the processor, a deviation score for each respective sequence based on a deviation of an expected sequence for each candidate root cause error log message and the determined sequence; and
determining, by the processor, a root cause log error message based on the calculated deviation scores.

2. The computer-implemented method of claim 1, wherein the log messages are correlated based on a semantic analysis of the log messages.

3. The computer-implemented method of claim 1, wherein the root cause error log message is further determined based on a position in the knowledge graph.

4. The computer-implemented method of claim 1, wherein the expected sequence for a candidate root cause error message of the plurality of candidate root cause error log messages is based at least in part on an application writing the candidate root cause error message of the plurality of candidate root cause error log messages.

5. The computer-implemented method of claim 1, wherein a data structure of the plurality of data structures comprises a memory address of a correlated log message.

6. The computer-implemented method of claim 1 further comprises:
ranking each candidate root cause error log message based on the deviation scores; and
displaying a ranked list of candidate root cause error log messages.

7. A system comprising:
a memory having computer readable instructions; and
one or more processors for executing the computer readable instructions, the computer readable instructions controlling the one or more processors to perform operations comprising:
constructing a knowledge graph by writing a plurality of data structures to connect correlated log messages in a system log;
detecting an anomalous log message based on the knowledge graph, wherein the anomalous log message is connected to a plurality of candidate root cause error log messages;
writing a bit to the system log to identify the anomalous log message;
determining respective sequences from each of the plurality of candidate root cause error log messages to the anomalous log message;
calculating a deviation score for each respective sequence based on a deviation of an expected sequence for each candidate root cause error log message and the determined sequence; and
determining a root cause log error message based on the calculated deviation scores.

8. The system of claim 7, wherein the log messages are correlated based on a semantic analysis of the log messages.

9. The system of claim 7, wherein the root cause error log message is further determined based on a position in the knowledge graph.

10. The system of claim 7, wherein the expected sequence for a candidate root cause error message of the plurality of candidate root cause error log messages is based at least in part on an application writing a candidate root cause error message of the plurality of candidate root cause error log messages.

11. The system of claim 7, wherein a data structure of the plurality of data structures comprises a memory address of a correlated log message.

12. The system of claim 7, the operations further comprise:
ranking each candidate root cause error log message based on the deviation scores; and
displaying a ranked list of candidate root cause error log messages.

13. A computer program product comprising a computer readable storage medium having program instructions embodied therewith, the program instructions executable by a processor to cause the processor to perform operations comprising:
constructing a knowledge graph by writing a plurality of data structures to connect correlated log messages in a system log;
detecting an anomalous log message based on the knowledge graph, wherein the anomalous log message is connected to a plurality of candidate root cause error log messages;
writing a bit to the system log to identify the anomalous log message;
determining respective sequences from each of the plurality of candidate root cause error log messages to the anomalous log message;
calculating a deviation score for each respective sequence based on a deviation of an expected sequence for each candidate root cause error log message and the determined sequence; and
determining a root cause log error message based on the calculated deviation scores.

14. The computer program product of claim 13, wherein the log messages are correlated based on a semantic analysis of the log messages.

15. The computer program product of claim 13, wherein the root cause error log message is further determined based on a position in the knowledge graph.

16. The computer program product of claim 13, wherein the expected sequence for a candidate root cause error message of the plurality of candidate root cause error log messages is based at least in part on an application writing the candidate root cause error message of the plurality of candidate root cause error log messages.

17. The computer program product of claim 13, wherein a data structure of the plurality of data structures comprises a memory address of a correlated log message.

* * * * *